(12) United States Patent
Ohya

(10) Patent No.: US 8,614,748 B2
(45) Date of Patent: Dec. 24, 2013

(54) IMAGING APPARATUS

(75) Inventor: Takeru Ohya, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/941,603

(22) Filed: Nov. 8, 2010

(65) Prior Publication Data
US 2011/0134267 A1    Jun. 9, 2011

(30) Foreign Application Priority Data
Dec. 4, 2009 (JP) ................................ 2009-276703

(51) Int. Cl.
*H04N 5/228* (2006.01)
*H04N 5/235* (2006.01)

(52) U.S. Cl.
USPC ..................................... 348/222.1; 348/229.1

(58) Field of Classification Search
USPC ............................................ 348/222.1, 229.1
See application file for complete search history.

(56) References Cited

U.S. PATENT DOCUMENTS

| 5,337,083 | A | * | 8/1994 | Murata et al. | 348/256 |
| 5,663,562 | A | * | 9/1997 | Jones et al. | 250/332 |
| 6,137,533 | A | * | 10/2000 | Azim | 348/222.1 |
| 6,707,492 | B1 | * | 3/2004 | Itani | 348/229.1 |
| 7,358,988 | B1 | * | 4/2008 | Konishi et al. | 348/222.1 |
| 7,830,436 | B2 |   | 11/2010 | Sumi et al. | |
| 8,115,841 | B2 | * | 2/2012 | Solhusvik | 348/294 |
| 2004/0080637 | A1 |   | 4/2004 | Nakamura et al. | 348/255 |
| 2008/0231736 | A1 | * | 9/2008 | Solhusvik | 348/294 |
| 2010/0045820 | A1 | * | 2/2010 | Prieto et al. | 348/229.1 |

FOREIGN PATENT DOCUMENTS

| JP | 2003-172611 | A | 6/2003 |
| JP | 2004-015701 |   | 1/2004 |
| JP | 2005-175517 | A | 6/2005 |
| WO | 2009-108557 | A |  9/2009 |

OTHER PUBLICATIONS

Office Action issued on Apr. 23, 2013, in counterpart Japanese application No. 2009-276703.

* cited by examiner

*Primary Examiner* — Sinh Tran
*Assistant Examiner* — Christopher K Peterson
(74) *Attorney, Agent, or Firm* — Fitzpatrick, Cella, Harper & Scinto

(57) ABSTRACT

For increasing a dynamic range, and for signal processing according the gain of an amplifying unit, an imaging apparatus comprises a pixel configured to generate a pixel signal by photoelectric conversion, an amplifying unit amplifying the pixel signal generated by the pixel using a plurality of gains and outputting a plurality of pixel signals corresponding to the plurality of gains, a synthesizing unit selecting one of the plurality of pixel signals output by the amplifying unit in accordance with the size of the pixel signal output by the amplifying unit and outputting a signal based on the selected pixel signal, and a signal processing unit processing the signal output by the synthesizing unit in accordance with the gain of the amplifying unit corresponding to the pixel signal selected by the synthesizing unit.

10 Claims, 6 Drawing Sheets

IMAGING APPARATUS

BACKGROUND OF THE INVENTION

1. Field of the Invention

The present invention relates to an imaging apparatus.

2. Description of the Related Art

For imaging apparatuses, there has been a demand for an increase in S/N and in dynamic range. A method for meeting the demand is disclosed in Japanese Patent Application Laid-Open No. 2004-15701. In this method, a gain applied before AD conversion is switched depending on the size of an analog signal. A higher gain is applied to a smaller analog signal to relatively reduce the adverse effect of possible subsequent noise. This allows the S/N to be improved. An imaging apparatus includes an image processing unit configured to carry out various types of image processing after reading images. For example, in the imaging apparatus in Japanese Patent Application Laid-Open No. 2004-15701, the image processing unit is connected to the latter stage of a noise canceller and a gain mismatch circuit. To carry out processing such as gain correction and shading correction, the image processing unit may require information on at what gain each pixel data has been read. As illustrated in FIG. 1 and FIG. 10 of Japanese Patent Application Laid-Open No. 2004-15701, gain information applied before AD conversion is output to the latter stage as an M-bit signal, separately from output N-bit data.

However, when the image data and the gain information are separately output to the latter stage as in the case of Japanese Patent Application Laid-Open No. 2004-15701, the number of required output lines is increased, and the system becomes complicated.

SUMMARY OF THE INVENTION

An object of the present invention is to provide an imaging apparatus, which can increase dynamic range and allow signal processing to be carried out in accordance with the gain of an amplifying unit, with a simple configuration.

According to one aspect of the present invention, an imaging apparatus comprises: a single pixel for generating a pixel signal by photoelectric conversion; an amplifying unit for amplifying, by a plurality of gains, the pixel signal generated by the single pixel, and outputting a plurality of pixel signals each corresponding to each of the plurality of gains; a synthesizing unit for selecting one from the plurality of pixel signals outputted from the amplifying unit according to magnitude of the plurality of pixel signals outputted from the amplifying unit, and outputting a signal based on the selected signal; and a signal processing unit for signal processing of the signal outputted from the synthesizing unit, according to the gain of the amplifying unit corresponding to the pixel signal selected by the synthesizing unit.

The present invention enables, with a simple configuration, an increase in dynamic range and to allow signal processing to be carried out in accordance with the gain of the amplifying unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Exemplary Embodiment

Figure 1:
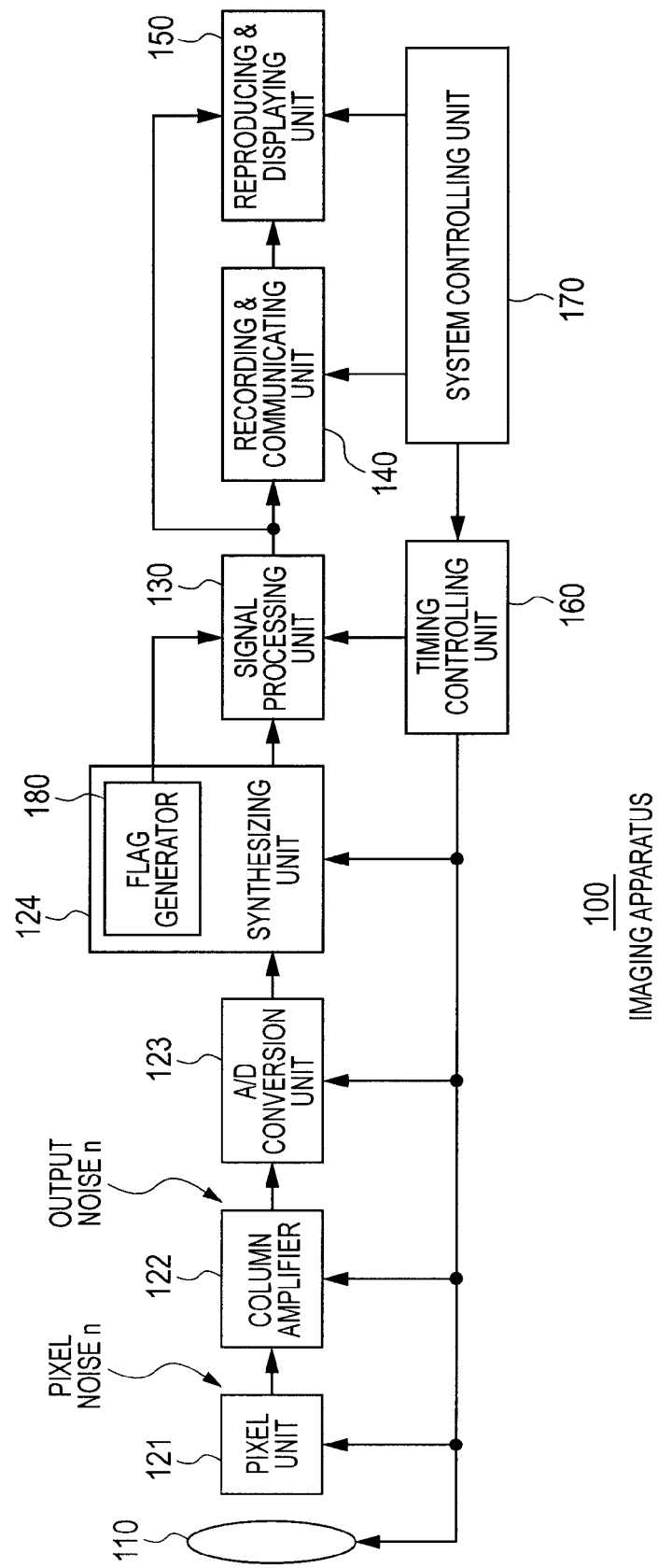
FIG. 1 is a block diagram of an imaging apparatus according to a first exemplary embodiment of the present invention.

FIG. 1 is a block diagram illustrating an example of the configuration of an imaging apparatus 100 according to a first exemplary embodiment of the present invention. Light from an object is incident through an optical unit 110 and is formed into an image on a pixel region 121. The pixel region 121 includes, for example, pixels arranged in a two-dimensional matrix, and each pixel converts the light from the object into an electric signal (pixel signal) for imaging. The image signal resulting from the conversion by each pixel in the pixel region 121 is amplified by a column amplifier unit 122 with a plurality of gains. The column amplifier unit 122 outputs a plurality of pixel signals corresponding to the plurality of gains. The plurality of outputs with the different gains from the column amplifier unit 122 are subjected to analog/digital (AD) conversion by an AD converter unit 123 and then synthesized by a synthesizing unit 124. Depending on the size of the pixel signals, the synthesizing unit 124 selects one of the input plurality of pixel signals, and outputs a signal based on the selected pixel signal. A method of synthesis will be described below. Depending on the gain of the column amplifier unit 122 corresponding to the pixel signal selected by the synthesizing unit 124, a signal processing unit 130 uses a predetermined method to process the signal output by the synthesizing unit 124. Then, the image signal processed by the signal processing unit 130 is recorded in a recording medium by a recording and communicating unit 140 or output to an external apparatus, or output directly to a displaying unit 150 for reproduction and display. Furthermore, the image signal recorded in the recording medium by the recording and communicating unit 140 is output to the displaying unit 150 for reproduction and display as necessary.

A timing controlling unit 160 controls driving timings for the optical unit 110, the pixel region 121, the column amplifier unit 122, the AD converter unit 123, the synthesizing unit 124 and the signal processing unit 130 based on the control of a system controlling unit 170. The system controlling unit 170 integrally controls the operation of the imaging apparatus 100. The system controlling unit 170 further controls the components of the imaging apparatus 100 including the recording and communicating unit 140, the displaying unit 150 and the timing controlling unit 160. Furthermore, the system controlling unit 170 controls driving of the optical unit 110, the pixel region 121, the column amplifier unit 122, the AD converter unit 123, the synthesizing unit 124 and the signal processing unit 130 through the timing controlling unit 160. A flag signal generator 180 generates a flag signal for identifying original data used for the synthesizing unit 124. The flag signal generator 180 then outputs the flag signal to the signal processing unit 130. Addition of the flag signal will be described in detail below. Based on the flag signal information, the signal processing unit 130 identifies the original data and processes the signal. In the present example, the flag signal generator 180 is located inside the synthesizing unit 124. However, the present invention is not limited to this configuration. For example, the flag signal generator 180 may be located inside one of the timing controlling unit 160 and the system controlling unit 170 or provided independently.

The principle of increasing dynamic range and the basic operation of the synthesizing unit 124 will be described below. In the present exemplary embodiment, the same pixel data is read from the column amplifier unit 122 using a plurality of gains, and the resultant signals are synthesized by the synthesizing unit 124. In the example described below, signals amplified by gains of x1 and x8 are synthesized for simplification. However, the present invention is not limited to these gains. Another combination of gains, for example, x1 and x16 or x2 and x16 may be used. Furthermore, in the description below, the gain of the column amplifier unit 122 is fixed. However, the column amplifier unit 122 may vary the gain. The number of gains to be synthesized is not limited to two but may be three or more.

Figure 2:
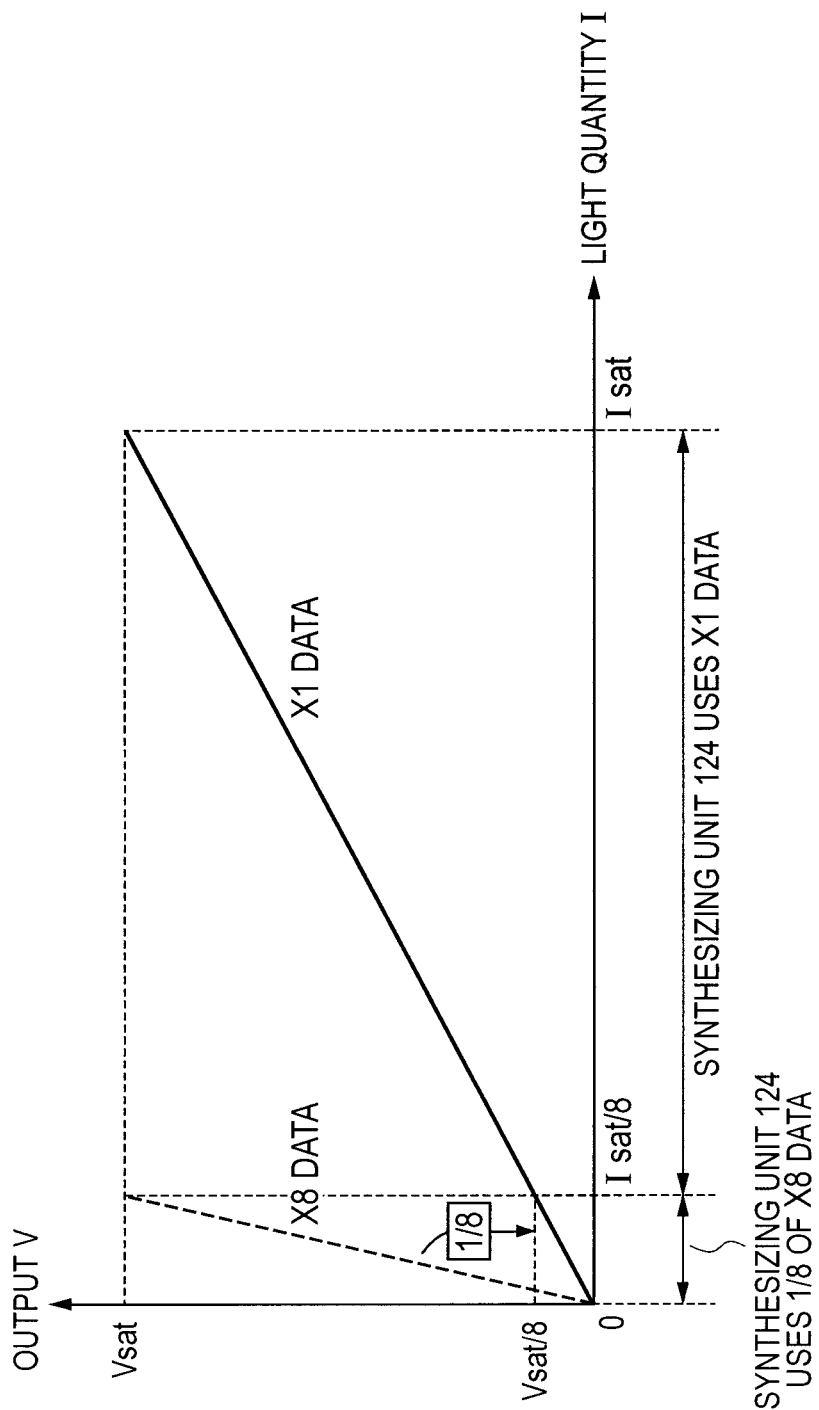
FIG. 2 is a diagram illustrating an operation of increasing the dynamic range.

FIG. 2 is a graph illustrating the relationship between the quantity I of light incident on the pixels in the pixel region 121 and data V output by the column amplifier unit 122. FIG. 2 illustrates data obtained when the gain is x1 and data obtained when the gain is x8. The gain x1 data reaches a saturated output Vsat at a light quantity Isat. On the other hand, the gain x8 data reaches the saturated output Vsat at a light amount Isat/8 that is one-eighth of the light quantity Isat. In this method, the column amplifier unit 122 outputs two types of data, gain x1 data and gain x8 data. The two types of data are subjected to AD conversion by the AD converter unit 123. The resultant data is transmitted to the synthesizing unit 124. As illustrated in the lower part of the graph in FIG. 2, for example, if the x8 data is not saturated, the synthesizing unit 124 selects the x8 data multiplied by one-eighth as output data. Otherwise, the synthesizing unit selects the x1 data as output data.

Possible noise and the dynamic range in this case will be described. Pixel noise (n) is superimposed to the signal in the path between the pixel region 121 and a position immediately before the column amplifier unit 122. Output noise N is superimposed to the signal in the path between the column amplifier unit 122 and a position immediately before the AD converter unit 123. When the pixel noise (n) resulting from the gain of x1 is defined as "n1", the pixel noise (n) resulting from the gain of x8 is "8×n1" that is eight times as large as n1. On the other hand, the output noise N is not affected by the gain and is thus equivalent regardless of whether the gain is x1 or x8. The output noise N is defined as "N0". When the gain is x1, the total noise is defined as "n1+N0". When the gain is x8, the total noise is defined as "8×n1+N0". Here, '+' denotes the sum of noise and indicates the square root of a square sum. This also applies to the description below.

When the gain x8 data is reduced to one-eighth, the noise is also reduced to one-eighth. Thus, when the gain x8 data is multiplied by one-eighth, the total noise is "n1+N0/8". Thus, the multiplication reduces the adverse effect of the output noise N to one-eighth compared to the case of the x1 gain. That is, compared to the x1 data, the data synthesized by the synthesizing unit 124 as described above involves the adverse effect of the output noise N reduced to one-eighth. On the other hand, the saturated output remains at Vsat, and the dynamic range, expressed by the indicators "saturated output/total noise", is increased.

Figure 3:
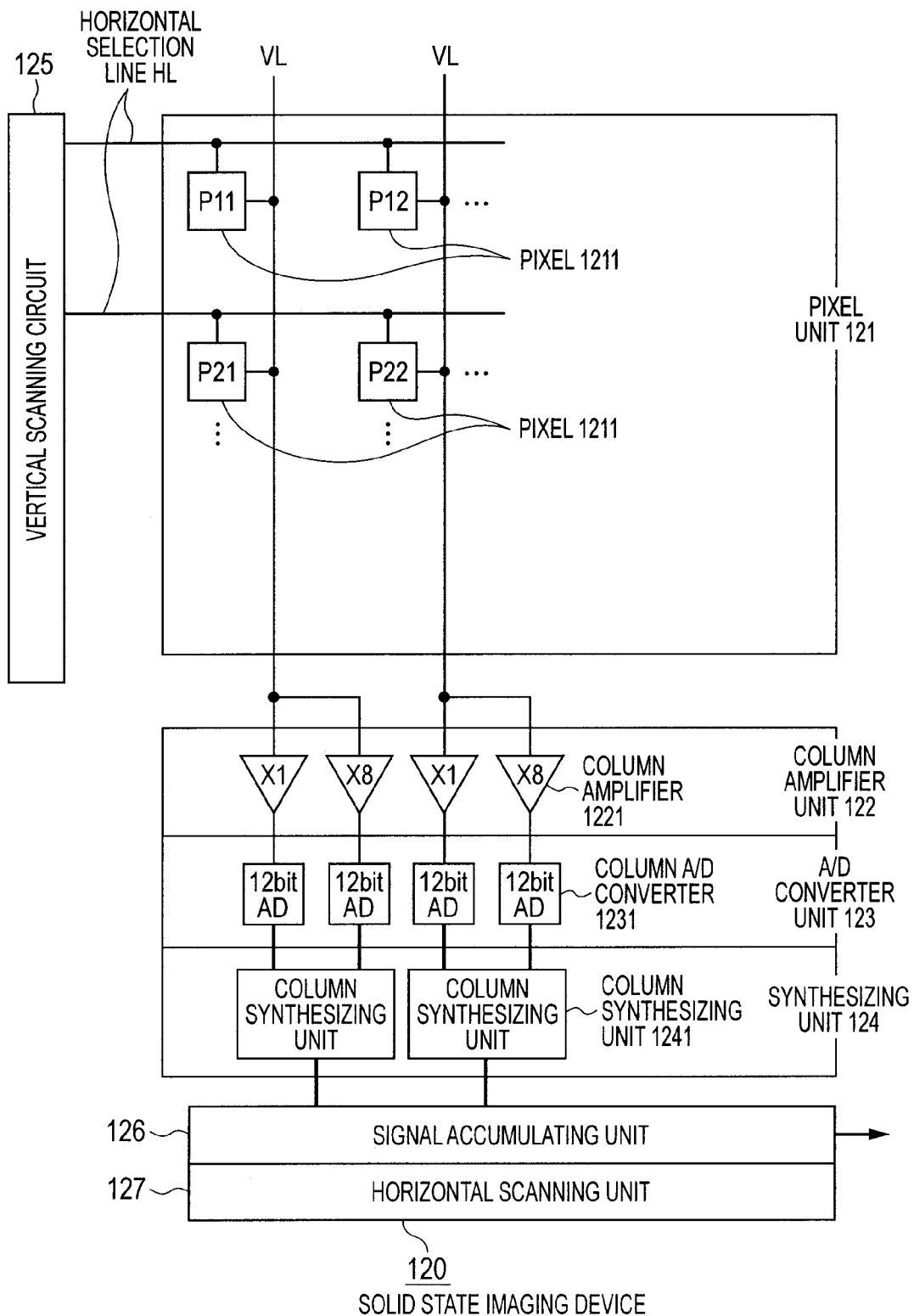
FIG. 3 is a diagram illustrating an example of the internal configuration of a solid-state imaging device.

FIG. 3 is a diagram illustrating an example of the internal configuration of a solid-state imaging device 120. The operation of the solid-state imaging device 120 will be described in brief with reference to FIG. 3. In the example described below, the solid-state imaging device 120 is a CMOS sensor. However, the present invention is not limited to this aspect. The solid-state imaging device 120 may be a CCD sensor. Furthermore, in the example described below, the pixel region 121, the column amplifier unit 122, the AD converter unit 123 and the synthesizing unit 124 are arranged inside the solid-state imaging device 120. However, the present invention is not limited to this aspect. For example, the pixel region 121 and the column amplifier unit 122 may be arranged inside the solid-state imaging device 120, with the AD converter unit 123 and the synthesizing unit 124 arranged outside the solid-state imaging device 120.

In the pixel region 121, pixels 1211 are arranged in a two-dimensional matrix. The pixels 1211 generate pixel signals based on photoelectric conversion. In accordance with the operation of a vertical scanning circuit 125, outputs from horizontal selection lines HL are determined to sequentially select horizontal rows of the pixels 1211. The data in the selected row of pixels 1211 is transmitted to column amplifiers 1221 in the column amplifier unit 122 via vertical signal lines VL. In each column, two column amplifiers 1221, a column amplifier with a gain of x1 and a column amplifier with a gain of x8, are arranged. Data multiplied by x1 and x8 by the respective column amplifiers 1211 are subjected to respective AD conversion by column AD converter units 1231 in the AD converter unit 123. In the description below, a 12-bit AD conversion is carried out. However, the AD conversion may be carried out on a different number of bits, or the number of bits may vary depending on the gain. Thereafter, the two types of gain data are synthesized by a column synthesizing unit 1241 in the synthesizing unit 124. The data resulting from the synthesis is temporarily held in a signal accumulating unit 126. In accordance with the operation of a horizontal scanning circuit 127, every single pixel data is output to the outside of the solid-state imaging device 120.

Figure 4:
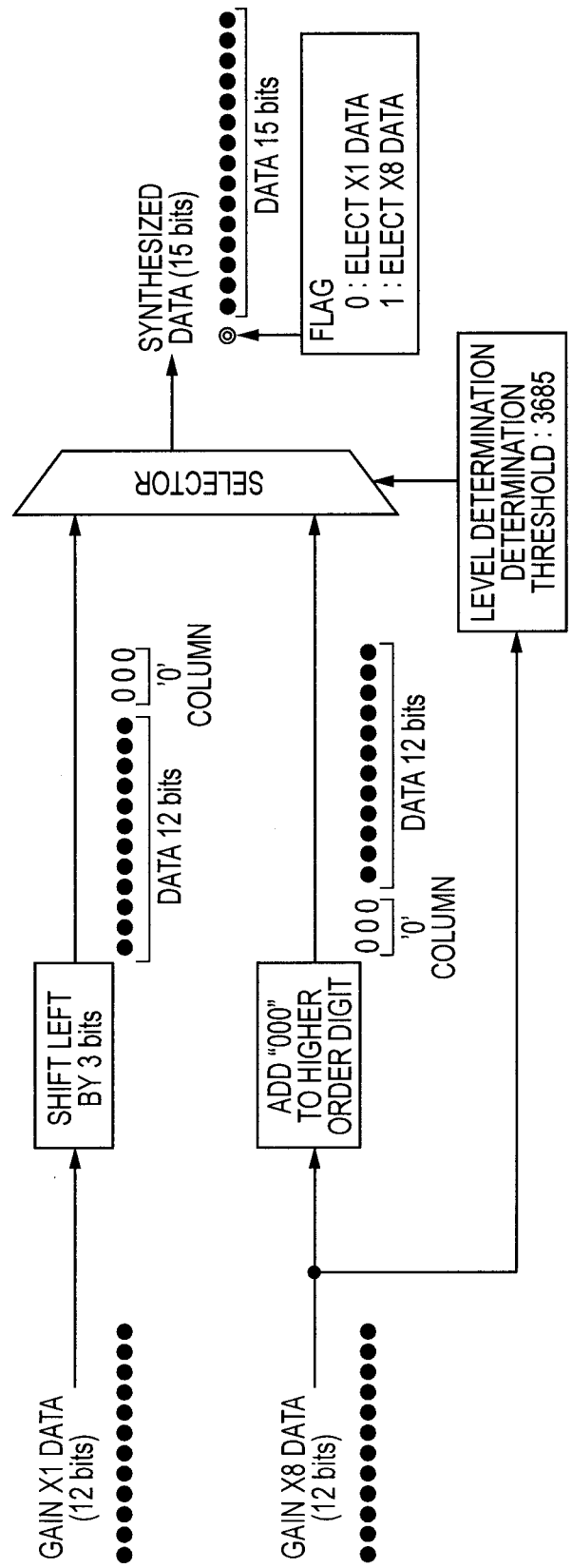
FIG. 4 is a diagram illustrating an example of an operation method for a column synthesizing unit.

FIG. 4 is a diagram illustrating the operation of the column synthesizing unit 1241 according to the first exemplary embodiment of the present invention. The column synthesizing unit 1241 allows the column AD converter units 1231 to receive 12-bit gain x1 data (pixel signal) and 12-bit gain x8 data (pixel signal). The column synthesizing unit 1241 shifts the 12-bit gain x1 data leftward by 3 bits, that is, multiplies the data by 8 to obtain 15-bit data. This allows the data to exhibit the same light quantity to output inclination as that of the gain x8 data. Three bits of '0' are added to the higher order side of the gain x8 data to also obtain 15-bit data. The output level of the gain x8 data is determined. Then, a selector operates as follows. If the level is lower than a determination threshold, the selector selects the data originally resulting from the gain of x8. If the level is equal to or higher than the determination threshold, the selector selects the data originally resulting from the gain of x1. The determination threshold is preset by the system, for example, to 3685, corresponding to 90% of the maximum value of the 12-bit data, 4095. That is, the column synthesizing unit 1241 normalizes the input plurality of data by bit shifting so that the plurality of data results from the same gain. The column synthesizing unit 1241 selects and outputs one of the normalized plurality of data.

The data output from the selector includes 15 bits. The column synthesizing unit 124 adds a flag signal indicating which of the data the selector has selected, to the data selected by the selector as a higher order digit bit (1 bit) of the data. The column synthesizing unit 124 outputs the data and flag signal to the signal processing unit 130 through the same wire. Thus, a simply configured imaging apparatus 100 can be provided.

The flag signal is set as follows. For example, a flag signal of 0 indicates that the original data results from the gain of x1, and a flag signal of 1 indicates that the original data results from the gain of x8. The column synthesizing unit 124 adds the flag signal (information) indicating the gain corresponding to the data selected by the selector, depending on the size of the gain x8 data. That is, when the gain x8 data is smaller than the determination threshold, the flag signal of 1 is added to the data. When the gain x8 data is equal to or larger than the determination threshold, the flag signal of 0 is added to the data. The signal processing unit 130, succeeding the synthesizing unit 124, can identify the original data by observing the flag signal. For example, the signal processing unit 130 carries out signal processing such as gain correction and shading correction depending on the flag signal. The illustrated method carried out by the column synthesizing unit 1241 is only illustrative. The synthesizing method, the determination threshold, and the addition of the flag signal are not limited to those described above. For example, the flag signal need not necessarily be added to the higher order digit bit side of the data but may be added to, for example, the lower order digit bit side.

Second Exemplary Embodiment

Figure 5:
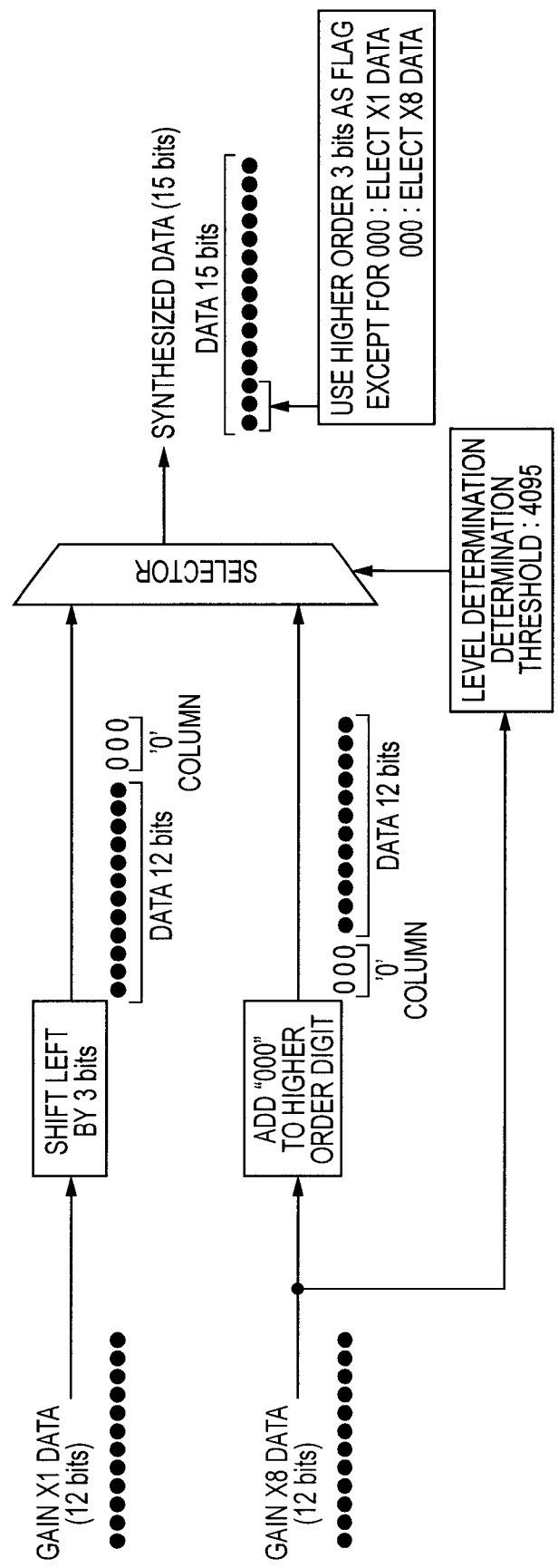
FIG. 5 is a diagram illustrating an example of an operation method for the column synthesizing unit.

FIG. 5 is a diagram illustrating the operation of the column synthesizing unit 1241 according to a second exemplary embodiment of the present invention. The differences between the present exemplary embodiment and the first exemplary embodiment will be described. A basic synthesizing operation according to the present exemplary embodiment is similar to that according to the first exemplary embodiment except for the determination threshold and the flag signal. In the present exemplary embodiment, the determination threshold is set to 4095, the maximum 12-bit value, and the higher order 3 bits of the 15 bits of the synthesized data are utilized as a flag signal. If the original data results from a gain of x8, the higher order 3 bits are always newly added "000". Furthermore, if the gain is x8, the determination threshold is 4095, corresponding to 512 for a gain of 1×(4095/8). The gain x1 data is shifted leftward by 3 bits, that is, multiplied by 8. Thus, at least 4096 is input to the selector. Namely, if the original data results from the gain of x1, the higher order 3 bits are always other than "000". As described above, the succeeding signal processing unit 130 uses the higher order digit bits (3 bits) as a flag signal (gain information) to determine that the original data results from the gain of x1 if the higher order 3 bits are other than "000". The signal processing unit 130 determines that the original data results from the gain of x8 if the higher order 3 bits are "000". The higher order digit bits of the data the number of which corresponds to the difference between the plurality of gains can be effectively used as the '0' bits for the flag signal (in the present embodiment, 8 times=3 bits). Furthermore, the flag signal need not necessarily be added to the higher order digit bit side of the data but may be added to, for example, the lower order digit bit side.

Third Exemplary Embodiment

Figure 6:
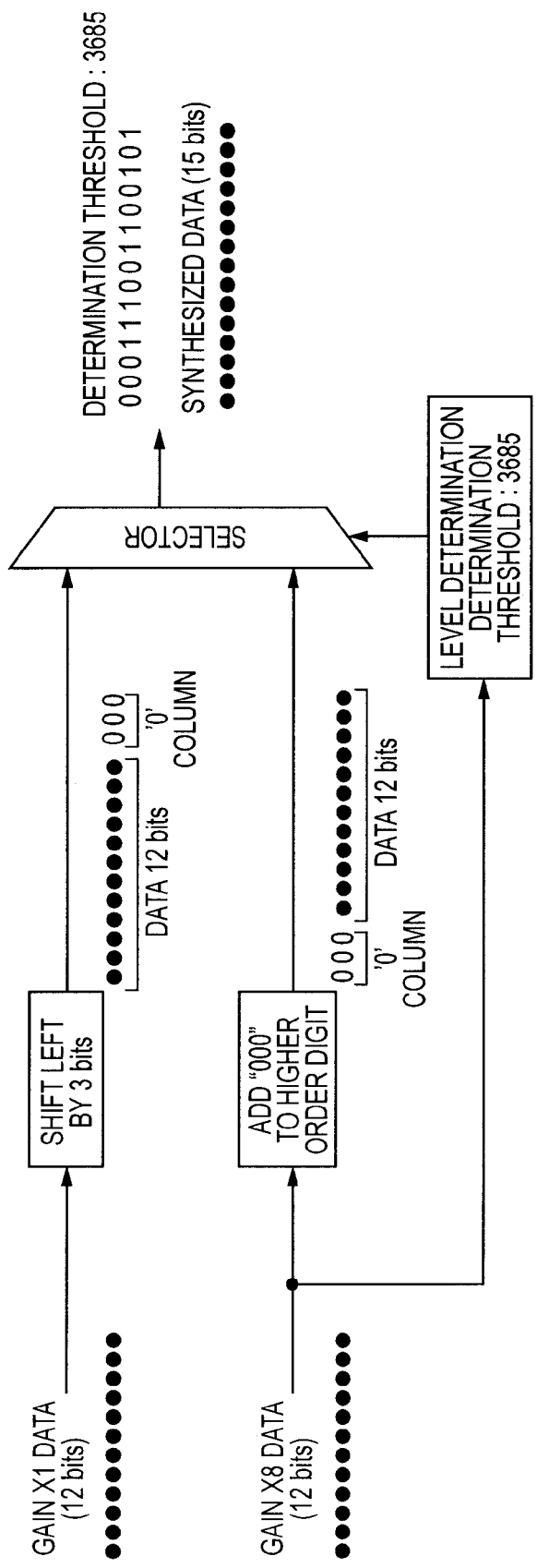
FIG. 6 is a diagram illustrating an example of an operation method for the column synthesizing unit.

FIG. 6 is a diagram illustrating the operation of the column synthesizing unit 1241 according to a third exemplary embodiment of the present invention. The differences between the present exemplary embodiment and the first exemplary embodiment will be described. A basic synthesizing method according to the present embodiment is similar to that according to the first exemplary embodiment. The present embodiment avoids using the flag signal but allows the synthesizing unit 124 to output the determination threshold to the signal processing unit 130 before outputting all the pixel data. Thus, the signal processing unit 130 can compare each of the subsequently output pixel data with the determination threshold to determine that the original data results from the gain of x1 when the pixel data is equal to or larger than the determination threshold. The signal processing unit 130 can also determine that the original data results from the gain of x8 when the pixel data is smaller than the determination threshold. That is, the column synthesizing unit 1241 compares the gain x8 data with the determination threshold. Based on the result of the comparison, the selector makes selection. Then, the synthesizing unit 124 outputs the determination threshold to the signal processing unit 130 before outputting the data. The signal processing unit 130 compares the data and determination threshold output by the synthesizing unit 124, and uses the result of the comparison as information on the gain of the column amplifier unit 122. In accordance with the gain of the column amplifier unit 122, the signal processing unit 130 processes the data output by the synthesizing unit 124. In the above description, the determination threshold is output as header information preceding all the pixel data. However, the present invention is not limited to this output timing. Furthermore, in another example, the system controlling unit 170 in FIG. 1 may output the determination threshold information to both the synthesizing unit 124 and the signal processing unit 130 via the timing controlling unit 160. This method also allows the determination threshold to be shared by the synthesizing unit 124 and the signal processing unit 130. Thus, the signal processing unit 130 enables the gain for the original data to be determined. Alternatively, the signal processing unit 130 may specify the determination threshold by outputting the determination threshold to the synthesizing unit 124.

Fourth Exemplary Embodiment

In the above-described second and third exemplary embodiments, it is assumed that the multiplying factor of the gain of x8 is exactly eight times as large as that of the gain of x1. In an actual device, the gains may have errors and the gain factor may not be exactly eight. A fourth exemplary embodiment of the present invention corresponds to a solution for gain errors. The fourth exemplary embodiment of the present invention will also be described with reference to FIG. 6. For example, the actual value of the gain of x8 in the column amplifier 1221 is assumed to vary from the design value (set value) by ±2%. In this case, when the design value of the gain is x8, the maximum actual value is x8.16. It is assumed that when the actual gain is x8.16, the gain x8 data is 3690. Then, since the data is larger than the determination threshold, the gain x1 data is selected. In this case, the gain x1 data is obtained by multiplying the output of "1/actual gain" of the gain x8 data, by eight by shifting the data by 3 bits, that is, (3690)/(8.16)×8=3618. This value is smaller than the determination threshold of 3685. Thus, the succeeding signal processing unit 130 determines that the original data results from the gain of x8.

Thus, when the gain exceeds x8, the situation occurs in which the data output by the synthesizing unit 124 originally results from the gain of x1 though the data is equal to or smaller than the determination threshold. Thus, the signal processing unit 130 fails to correctly determine the gain for the original data. To avoid this, the present exemplary embodiment, for example, sets the design value to x7.8 with an error of ±2% taken into account for a maximum of x7.96 so as to prevent the maximum actual value from exceeding x8. Hence, the gain x1 data can always be prevented from being smaller than the determination threshold. The numbers cited herein are only illustrative. In general, if the two gains of the column amplifier unit 122 have design values ai and bi and actual values ar and br, respectively, when ai>bi, the relationship ar<br×ai/bi may be established.

The above-described embodiments only illustrate specific examples in which the present invention is implemented. The above-described embodiments are not intended to have the technical scope of the present invention limitedly interpreted. That is, the present invention may be implemented in various forms without departing from the technical concept or main features thereof.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-276703, filed Dec. 4, 2009, which is hereby incorporated by reference herein in its entirety.

What is claimed is:

1. An imaging apparatus comprising:
   a pixel for generating a pixel signal by photoelectric conversion;
   an amplifying unit configured to amplify, by a plurality of gains, the pixel signal generated by said pixel, and output a plurality of pixel signals respectively corresponding to the plurality of gains;
   a synthesizing unit configured to select one from the plurality of pixel signals outputted by said amplifying unit according to a magnitude of each of the plurality of pixel signals, and output a signal based on the selected pixel signal; and
   a signal processing unit configured to process the signal outputted by said synthesizing unit, according to a gain of said amplifying unit corresponding to the pixel signal selected by said synthesizing unit,
   wherein said synthesizing unit outputs information of the gain corresponding to the selected pixel signal, according to the magnitude of the pixel signal outputted by said amplifying unit.

2. The imaging apparatus according to claim 1, wherein said synthesizing unit adds the gain information of said amplifying unit to the signal to be outputted based on the selected pixel signal, and outputs the resulting signal to said signal processing unit.

3. The imaging apparatus according to claim 1, wherein said signal processing unit performs the signal processing of the signal outputted by said synthesizing unit, according to the gain information of said amplifying unit contained in the signal outputted by said synthesizing unit.

4. The imaging apparatus according to claim 3, wherein the gain information of the amplifying unit is a bit number corresponding to a difference of the plurality of gains for the signals outputted from the synthesizing unit.

5. The imaging apparatus according to claim 3, wherein the amplifying unit operates such that, when two gain set values ai and bi correspond respectively to actual gain values ar and br, and ai>Bi, a relation ar<br×ai/bi is met.

6. The imaging apparatus according to claim 1, wherein
   the synthesizing unit compares the pixel signal outputted from the amplifying unit with a threshold value, and performs the selection according to a result of the comparing, and the signal processing unit compares the signal outputted from the synthesizing unit with the threshold value, and performs the signal processing of the signal outputted from the synthesizing unit according to the gain of the amplifying unit in relation to a result of the comparing as the gain information of the amplifying unit.

7. The imaging apparatus according to claim 6, wherein the synthesizing unit outputs the threshold value to the signal processing unit.

8. The imaging apparatus according to claim 6, wherein the signal processing unit outputs the threshold value to the synthesizing unit.

9. The imaging apparatus according to claim 6, further comprising a controlling unit for outputting the threshold value to the synthesizing unit and the signal processing unit.

10. The imaging apparatus according to claim 1, wherein said synthesizing unit normalizes, by a bit shift manner, the plurality of pixel signals outputted by said amplifying unit so as to have the same gain, and selects and outputs the one of the plurality of normalized pixel signals.

* * * * *